United States Patent [19]
Keller et al.

[11] 3,952,999
[45] Apr. 27, 1976

[54] WIRE PULLING APPARATUS

[76] Inventors: Charles Robert Keller, 2816 Kring, San Jose, Calif. 95125; William D. Martin, 12749 Quito Road, Saratoga, Calif. 95070

[22] Filed: May 12, 1975

[21] Appl. No.: 576,286

[52] U.S. Cl. .................................. 254/134.3 R
[51] Int. Cl.² ................................. E21C 29/16
[58] Field of Search ............ 254/134.3 R, 134.3 FT, 254/190 R, 139.1, 145

[56] References Cited
UNITED STATES PATENTS

| | | | |
|---|---|---|---|
| 2,221,903 | 11/1940 | Abramson et al. | 254/134.3 R |
| 2,948,510 | 8/1960 | Kieser | 254/134.3 R |
| 3,140,856 | 7/1964 | Carpenter | 254/134.3 R |
| 3,201,090 | 8/1965 | Jones | 254/134.3 FT |
| 3,223,384 | 12/1965 | Gebo | 254/134.3 FT |
| 3,291,449 | 12/1966 | Hughes | 254/134.3 FT |

FOREIGN PATENTS OR APPLICATIONS 174,199  3/1953  Austria.......................... 254/134.3 R

*Primary Examiner*—Al Lawrence Smith
*Assistant Examiner*—Robert C. Watson
*Attorney, Agent, or Firm*—Schatzel & Hamrick

[57] ABSTRACT

An apparatus for pulling a wire through a conduit comprising a base including a planar bottom surface for frictionally engaging a floor and a pair of wedges for anchoring the base to a wall, a pair of upstanding members each being affixed to the base, a shaft oriented with its axis parallel to the bottom surface and journaled proximate each end to the upstanding members, and a pulley secured to an end of the shaft, the pulley having a grooved rim which is formed to receive the wire and having a diameter large enough to prevent the wire from acquiring a set.

6 Claims, 3 Drawing Figures

U.S. Patent   April 27, 1976   3,952,999
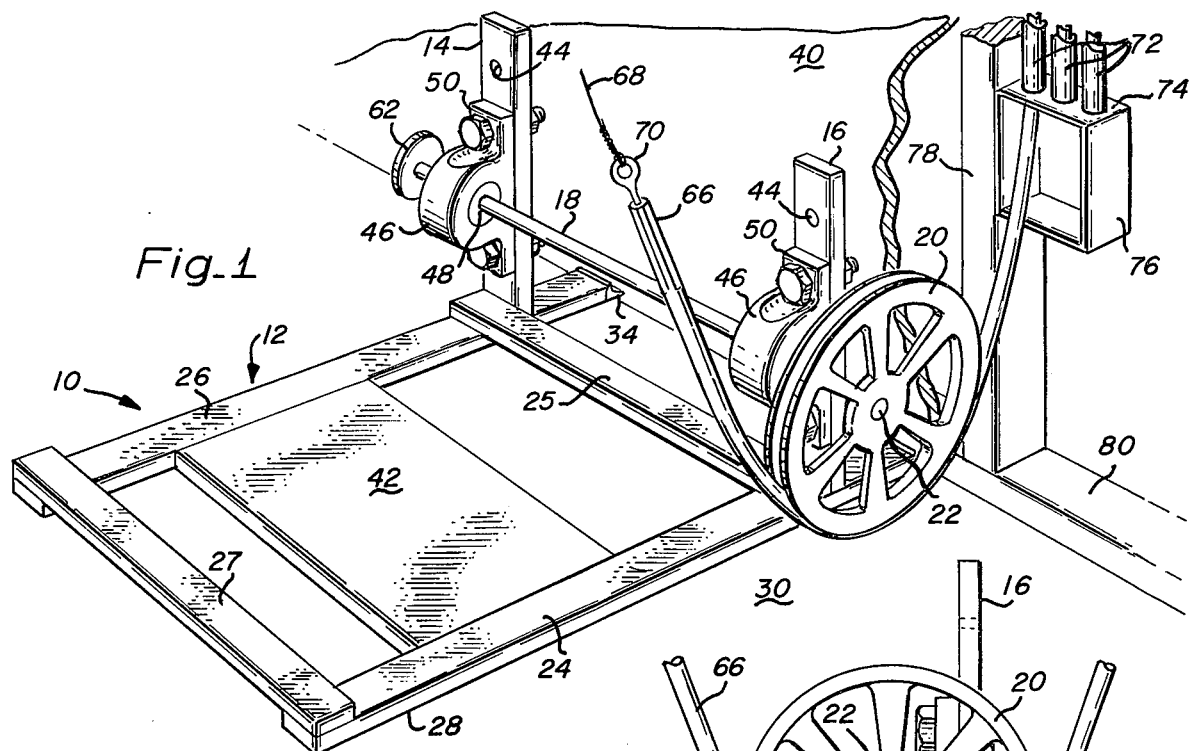
Fig. 1
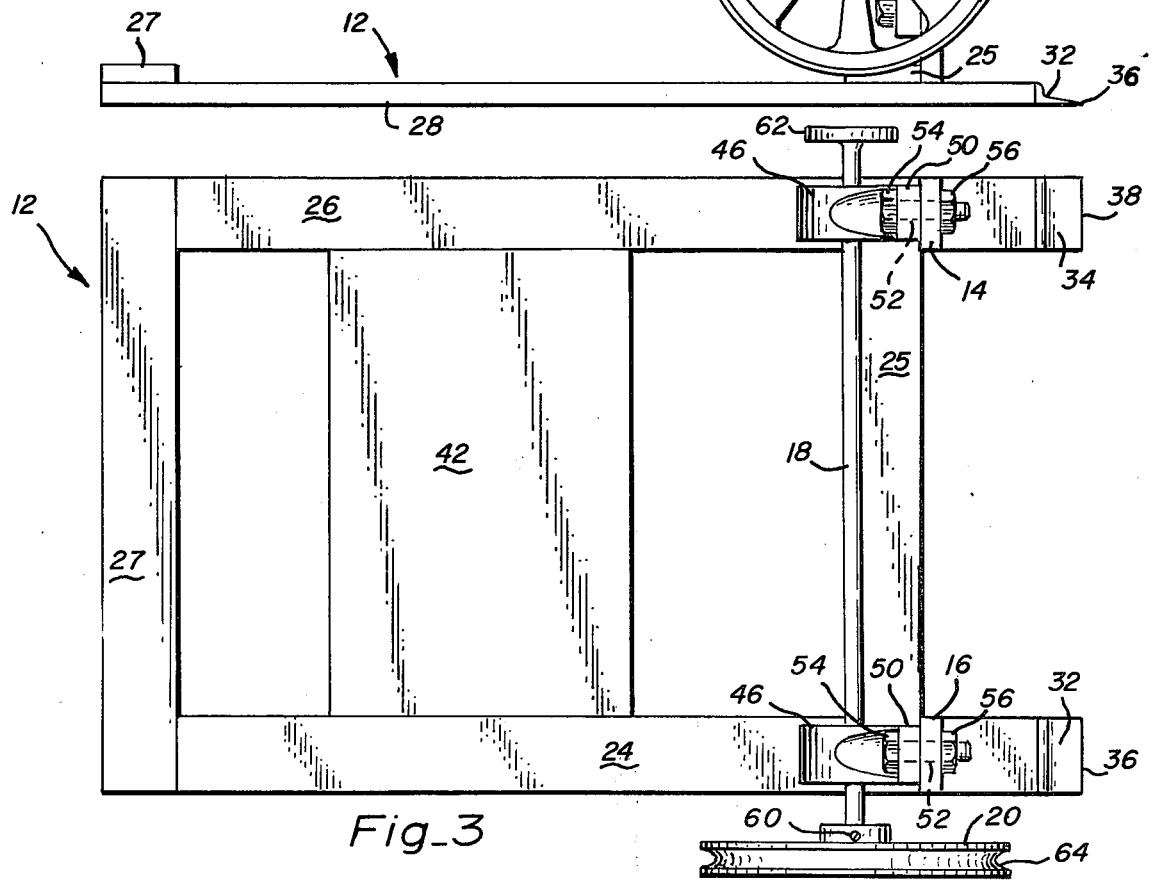
Fig. 2
Fig. 3

WIRE PULLING APPARATUS

BACKGROUND OF THE INVENTION

1. Field of the Invention

The present invention relates generally to apparatus for use by an electrician in stringing electrical wiring, and more particularly to an apparatus for facilitating the pulling of long lengths of wire through previously installed conduit.

2. Description of the Prior Art

Heretofore, pulling wire through a conduit has been one of the most difficult and time-consuming tasks of electricians. In accordance with present standard practices, a "fishing" line, fabricated from either steel or nylon, is fed through a conduit system to an outlet box. Subsequently, an insulated wire is connected to the trailing end of the fishing line. The leading end of the fishing line is then pulled by hand from the outlet box, thus drawing the wire through the conduit, until the wire is pulled into the outlet box. Since most outlet boxes are disposed on a wall between 12 and 18 inches above the floor, a person is required to kneel beside the outlet box and pull the line or wire with a downward thrust. Because of the proximity of the outlet box to the floor, only about six to eight inches of the wire are able to be drawn through the conduit with each pulling thrust. In almost all cases, a second person is required to push the wire from the other end of the conduit system to overcome the frictional force between the wire and the conduit. Hence, it should be realized that because of the time required to pull the line through the outlet box and the associated labor cost, the present practice results in relatively large costs to the consumer.

In the patent art, several patents teach wire pulling apparatus. In particular, U.S. Pat. No. 2,746,715 entitled "Wire Guiding Device" by V. J. Sherrod, and U.S. Pat. No. 3,113,759 entitled "Wire Puller" by H. C. Lindemark, teach wire pulling devices which include a frame having a small pulley or spool mounted therewithin and means for mounting the device to a junction box. Each of the devices serves to bend the wire as the wire is drawn over the pulley. Because of the small size of the pulleys, the wire tends to become case hardened after being drawn over the pulley. U.S. Pat. No. 3,514,048, entitled "Cable Feed Apparatus" by N. J. Lowery, teaches a cable feed apparatus which permits a cable to be wound onto, or unwound from a drum while the cable is being appropriately guided by a tubular member. The tubular member is mounted around the rim of a wheel which is rigidly fastened to a frame to prevent the wheel from rotating.

SUMMARY OF THE PRESENT INVENTION

Accordingly, it is an object of the present invention to provide an apparatus which will simplify the task of pulling a wire through a conduit. Another object of the present invention is to provide a wire pulling apparatus which may be used by a person standing in an upright position.

Still another object of the present invention is to provide a portable wire pulling apparatus which is not required to be mechanically fastened to an outlet box.

Yet another object of the present invention is to provide a wire pulling apparatus which requires very little maintenance and which serves to increase the useful life of a fishing line used to guide the wire to an outlet box.

Briefly, the preferred embodiment comprises a base having a planar bottom surface for frictionally engaging a floor and a pair of wall-engaging wedges for anchoring the base to a wall, a pair of upstanding members each affixed to the base, a shaft oriented with its axis parallel to the bottom surface and journaled proximate each end to the upstanding members, and a pulley affixed to an end of the shaft. The pulley has a rim which is formed to receive the wire and has a diameter large enough to prevent the wire from acquiring a set.

When the wire is wound around a portion of the rim, pulling the wire causes the shaft to rotate such that substantial lengths of the wire slide past the rim.

An advantage of the present invention is that it enables one person standing in an upright position to pull substantial lengths of wire through a conduit in a relatively short period of time.

Another advantage of the present invention is that it is portable and may be anchored to a wall fabricated from wood, metal or concrete.

Still another advantage of the present invention is that it does not require maintenance and serves to increase the life of the fishing line used in association therewith.

The foregoing and other objects, features and advantages of the invention will be apparent from the following detailed description of the preferred embodiment illustrated in the several figures of the drawing.

IN THE DRAWING

FIG. 1 is a perspective view of a wire pulling apparatus in accordance with the present invention;

FIG. 2 is a side elevational view of the apparatus of FIG. 1; and

FIG. 3 is a plan view of the apparatus of FIG. 1.

DETAILED DESCRIPTION OF THE PREFERRED EMBODIMENT

FIG. 1 illustrates in a perspective view a wire pulling apparatus 10 in accordance with the present invention. The apparatus 10 includes a base 12, a pair of upstanding members 14 and 16, each being affixed to the base 12, a shaft 18 oriented with its axis parallel to the base 12 and journaled proximate each end to the upstanding members 14 and 16, and a pulley, or wheel, 20 affixed to an end 22 of the shaft 18.

The base 12 includes four elongated parallelapiped-shaped steel members 24-27 secured together, as by welding, to form a rectangular frame as shown in FIGS. 1 and 3. The bottom surface 28 of the members 24 and 26 is generally planar and provides a relatively large surface in frictional contact with a floor 30 to prevent the apparatus from moving during the operation. Secured to the front end of the members 24 and 26 are a pair of steel wedges 32 and 35 which are sharply tapered to form pointed edges 36 and 38, respectively. The edges 36 and 38 serve to pierce a wall 40 (shown partially for the sake of clarity), or the intersection between the wall 40 and the floor 30, thus anchoring the base 12 firmly in place. It has been found that the steel wedges 32 and 34 are able to pierce walls or studs fabricated from wood, metal or concrete when forced thereagainst, such as by kicking the member 27. A rigid footplate 42 is secured to the mid-point of the members 24 and 26 and serves to increase the area of the bottom surface in frictional contact with the floor 30.

An end of each of the upstanding members 14 and 16 is affixed, as by welding, to the respective top surfaces of the members 24 and 26 adjacent the member 25 such that the upstanding members 14 and 16 are perpendicular to the bottom surface 28. Each of the upstanding members 14 and 16 includes two or more mounting holes 44 separated vertically from each other by predetermined distances. A pair of bearing mounts 46 is mounted to the respective members 14 and 16. Each mount 46 includes a shaft-receiving aperture 48 and a bearing plate 50. A pair of holes 52 extends through the plate 50. The holes 52 are spaced apart a distance equal to that separating the holes 44. A pair of bolts 54 is inserted through the aligned holes 44 and 52 and secured with nuts 56, so as to selectively fasten the bearing mounts 46 at a preselected height above the floor 30.

Shaft 18 has an elongated cylindrical shape with its longitudinal dimension being substantially one and one-half times the separation between the upstanding members 14 and 16. The shaft 18 extends through the apertures 48 and is oriented with its axis parallel to the surface 28. The end 22 is secured to the pulley 20 by a set screw 60. A keeper 62 is secured, as by welding, to the end of the shaft 18 opposite the pulley 20 to maintain the shaft journaled to the members 14 and 16.

With reference to FIG. 3, the pulley 20 includes a grooved rim 64 that is generally V-shaped in cross section since this shape has been found to prevent a wire 66 or a fishing line 68 from jumping off the pulley 20 during usage. In addition, the rim 64 should have a diameter of at least 8 inches to prevent the wire 66 (or steel fishing line 68) from acquiring a set or becoming crimped or distorted as the wire or the line is drawn around the rim.

The wire 66 generally comprises a multiplicity of electrical conductors (see FIG. 1) and has an eyelet 70 removably fastened to its leading end. The trailing end of the fishing line 68 is connected to the eyelet 70 and serves to guide the wire through previously-installed conduit 72.

As shown, three conduits 72 terminate on a top plate 74 of an outlet box 76. The origin of the conduits 72 is not shown. The outlet box 76 is fastened to a vertical stud 78 such that the top plate 74 is about 4 to 20 inches above the floor 30. The vertical stud 78 and a horizontal stud 80 form a frame for supporting the wall 40.

In operation, the electrician at the distant end of the conduit 72 fishes, or pushes, the leading end of the fishing line 68 through the conduit 72 which is to receive the wire 66. By appropriately fishing and pushing the line 68, its leading end can be made to appear in the outlet box 76. Hence, the line 68 forms a continuous path through the conduit 72. The trailing end of the line 68 is tied to the eyelet 70 and the wire 66 is placed into the conduit 72. At the outlet box 76, the electrician places the apparatus 10 on the floor 30 adjacent the wall 40 with the pulley 20 disposed adjacent the wire-receiving conduit 72. The wedges 32 and 34 are then forced into engagement with the wall 40 to firmly secure the apparatus 10 in position. Next the fishing line 68 is wound around a portion of the underside or rim 30.

Once the preceding sequence of steps have been performed, the electrician faces the wall in a standing or generally upright position with one or both of his feet on the footplate 42 and pulls the fishing line 68 upwardly. Since the electrician is allowed to stand upright and is free to pull with both hands and because of the relatively large radius of the rim 64, substantial forces may be applied to the fishing line 68 and thus transmitted directly to the wire 66. These forces cause the pulley 20, and hence the shaft 18, to rotate as the wire 66 is pulled through the conduit 72. By grasping a portion of the fishing line 68 near the pulley 20 and pulling it upwardly in a long continuous thrust, it has been found that lengths of approximately four or five feet of wire may be pulled through the conduit with each thrust. This compares very favorably to the present push-pull operation previously described which allows only about 6 to 8 inches of wire to be pulled through the conduit with each thrust. Moreover, since the radius of the rim is at least four inches, neither the steel line 68 nor the copper wire 66 becomes crimped or distorted, as typically occurs when a copper wire is drawn over an object having a small radius.

After the entire fishing line 68 has been pulled through the conduit 72 and the desired length of the wire 66 extends into the outlet box 76 (see FIG. 2), the operation is complete. Hence, the fishing line 68 may be unfastened from the eyelet 70 and the eyelet 70 removed from the wire 66.

To pull a wire through another one of the conduits 72, the shaft 18 is moved horizontally until the pulley 20 is aligned with the selected conduit and the pulling operation is again performed. It should be recognized that wires can be pulled through several conduits terminating at the same outlet box without moving the apparatus.

In the preferred embodiment, the elements comprising the base and the upstanding members are formed from steel tubing which is approximately 1 inch square. The wedges and footplate are formed from steel. As formed, the wedges are coplanar with the base surface and extend about one-half inch behind the front of the base. The footplate is about 3 inches in width and about 8 inches in length, the shaft is approximately 15 inches long, and the rim has a width of about ¾ inch and a depth of ¾ inch.

In an alternative embodiment, bearings are arranged in a circular pattern around the apertures 48 to facilitate rotation of the shaft 18.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. An apparatus for use in pulling a wire through a conduit which terminates at an outlet box installed on a wall comprising:
   a base including a planar bottom surface adapted to be positioned on a floor near the outlet box, said base including means for anchoring said base to the wall;
   a pair of upstanding members each being affixed to said base;
   a shaft oriented with its axis parallel to said base and journaled proximate each end to said upstanding members; and
   a pulley having a grooved rim and being secured to a first end of said shaft, said rim being formed to receive the wire and having a diameter large enough to prevent the wire from acquiring a set.

2. An apparatus as recited in claim 1 wherein said shaft has a longitudinal dimension which is greater than the distance between said upstanding members, said shaft being slideably movable relative to said upstanding members, whereby said wheel may be selectively positioned relative to the outlet box.

3. An apparatus as recited in claim 1 and further comprising keeper means secured to a second end of said shaft to prevent said shaft from being removed from said upstanding members.

4. An apparatus as recited in claim 1 wherein said base is substantially rectangular in plan view and includes a footplate for providing increased surface area in frictional contact with the floor.

5. An apparatus as recited in claim 1 wherein each said upstanding member includes means forming a plurality of mounting holes located at different heights above said bottom surfaces and separated by predetermined spacings, and further comprising a pair of bearing mounts each having a pair of holes separated by said predetermined spacing and including an aperture for receiving said shaft, and fastening means for mounting said bearing mounts to said respective upstanding members at a preselected height above said bottom surface.

6. An apparatus as recited in claim 5 and further comprising a pair of bearing assemblies disposed within said apertures for facilitating rotation of said shaft.

* * * * *